United States Patent
Igumnov et al.

(10) Patent No.: US 6,821,496 B2
(45) Date of Patent: Nov. 23, 2004

(54) PROCESS FOR PREPARING NITROGEN TRIFLUORIDE

(75) Inventors: Sergei Mikhailovich Igumnov, Moscow (RU); Valery Pavlovich Kharitonov, Perm (RU)

(73) Assignee: Zakrytoe Aktsionernoe Obschestvo Nauchno Proizvodstvennoe Obiedinenie "PiM-Invest", Moscow (RU)

(*) Notice: Subject to any disclaimer, the term of this patent is extended or adjusted under 35 U.S.C. 154(b) by 295 days.

(21) Appl. No.: 10/073,001

(22) Filed: Feb. 12, 2002

(65) Prior Publication Data

US 2003/0003042 A1 Jan. 2, 2003

(30) Foreign Application Priority Data

May 8, 2001 (RU) ........................................ 2001112703

(51) Int. Cl.[7] .............................................. C01B 21/00
(52) U.S. Cl. ....................................................... 423/406
(58) Field of Search ........................................ 423/406

(56) References Cited

U.S. PATENT DOCUMENTS

| 3,235,474 | A |   | 2/1966 | Tompkins et al. |         |
|-----------|---|---|--------|-----------------|---------|
| 3,961,024 | A |   | 6/1976 | Vitek           |         |
| 4,091,081 | A |   | 5/1978 | Woytek et al.   |         |
| 4,543,242 | A | * | 9/1985 | Aramaki et al.  | 423/406 |
| 5,628,894 | A | * | 5/1997 | Tarancon        | 423/408 |
| 5,637,285 | A |   | 6/1997 | Coronell et al. |         |
| 6,183,713 | B1| * | 2/2001 | Tokunaga et al. | 423/406 |

FOREIGN PATENT DOCUMENTS

JP      2-255513     10/1990

OTHER PUBLICATIONS

Brauer, 3. (Ed.), Handbuch der praparativen anorganishen Chemie. "Mir" Publishers 1985, vol. 1, pp. 220–221 (Russian translation), no month.
Morrow, Scott I., et al., "Fluorination of Ammonia". J. Amer. Chem. soc., pp. 5301–5304, Oct. 20, 1960.
Herklemann, Ralf, "Handling and Security in the Sythesis and Purification of Nitrogen Trifluoride". Journal of Fluorine Chemistry, p. A37, no date.
Gmelin Handbook, F. Suppl., vol. 4, pp. 172–173, no date.
Schmsisier, Von M. And Huber, F., "Elektrochemishe Fluorierung von Stickstoffhaltigen Verbindungen zur Gewinnung von Stickstofftrifluorid". Zeitschrift fur anorganische und allgeme Chemie, 367:62–79, 1969, no month.

* cited by examiner

*Primary Examiner*—Wayne A. Langel
(74) *Attorney, Agent, or Firm*—Nath & Associates PLLC; Gary M. Nath; Tanya E. Harkins

(57) ABSTRACT

The invention relates to a new process for preparing nitrogen trifluoride which finds extensive application in the technology of semiconductors, high energy lasers, and chemical vapor deposition.

Nitrogen trifluoride is prepared by the fluorination of urea or its decomposition products with elemental fluorine in anhydrous hydrogen fluoride at a temperature of from −20° C. to 0° C. and the molar ratio of fluorine to the starting compounds of not over 3. The concentration of the starting compounds in anhydrous hydrogen fluoride is preferably 20–50% by weight.

The proposed process is explosion-safe and gives a product with maximum content of nitrogen trifluoride and minimum concentration of admixtures, with the yield of up to 90%.

4 Claims, No Drawings

PROCESS FOR PREPARING NITROGEN TRIFLUORIDE

FIELD OF THE ART

The present invention relates to inorganic chemistry, and more particularly to a process for preparing nitrogen trifluoride.

PRIOR ART

Nitrogen trifluoride finds extensive application in the technology of semiconductors, high energy lasers, and chemical vapor deposition. In contrast to elemental fluorine, nitrogen fluoride is easy to transport in condensed state at a pressure of up to 75 kgf/cm$^2$ and packing density of up to 600 g/l (J. Fluor. Chem., 1991, 54, No. 1–3, p. 37).

Industrial technologies of producing nitrogen trifluoride are based on the electrolysis of molten ammonium hydrogen fluorides and on the direct fluorination of ammonium with elemental fluorine.

The most elaborated industrial process for nitrogen trifluoride synthesis is the electrochemical synthesis of $NF_3$ from ammonium hydrogen fluorides (Gmelin Handbook, 1986, v. 4, pp. 172–173; Handbuch der präparativen anorganishen Chemie, G. Brauer (Ed.) Moscow, "Mir" Publishers 1985, vol. 1, pp. 220–221 (Russian translation)).

The optimum process parameters for the electrochemical synthesis of $NF_3$ are: the temperature of 100–130° C., the melt composition corresponding to $NH_4F/HF$: 1.1 to 1.8, current density of from 0.05 to 0.15 A/cm$^2$. The current yield for $NF_3$ is 70%.

The process of electrochemical synthesis of $NF_3$ suffers from such disadvantages as explosion hazards involved by the formation of a mixture of nitrogen trifluoride with hydrogen, the use of gaseous ammonia in the step of obtaining ammonium hydrogen fluorides. Furthermore, the implementation of this process requires large capital inputs because of using costly nickel-containing structural materials, most stable in the corrosion-active medium of molten hydrogen ammonium fluorides.

For reducing the explosion hazard presented by mixtures of nitrogen trifluoride with hydrogen, a method of electrochemical synthesis was proposed, envisaging dilution of the anode gas with nitrogen to the $NF_3$ concentration less than 9.5% (U.S. Pat. No. 3,235,474, 204–63, Feb. 15, 1966). However, diluting the production gas with nitrogen adds much to the expenses for nitrogen trifluoride purification and condensation equipment.

It is known from the literature, that as starting material for producing nitrogen trifluoride by the method of electrochemical fluorination it is possible to use solutions of urea and other nitrogen-containing compounds: pyridine, hydrazine, guanidine, semicarbazide in anhydrous hydrogen fluoride (Z. anorg. allgem. Chem., 1969, v. 367, pp. 62–79). In accordance with this method, nitrogen trifluoride is obtained with a yield of from 16 to 38%.

The chemism of the process of electrochemical fluorination of urea is described by the following equations:

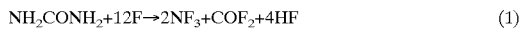  (1)

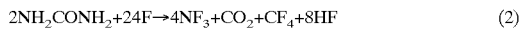  (2)

The resulting electrolysis gas after alkaline purification from acid admixtures of $CO_2$ and $COF_2$ contained up to 10% $CF_4$. In the fluorination of pyridine the content of $CF_4$ reached 34% of the volume of the obtained nitrogen trifluoride. This circumstance substantially complicates $NF_3$ purification, since it is difficult to separate $NF_3$ from carbon tetrafluoride. As it follows from the chemism of the process, represented by equations (1) and (2), in the process of electrochemical fluorination there is formed in total at least (with the 100% yield of $NF_3$) 0.5 mole of such admixtures as $CO_2$, $COF_2$ and $CF_4$ per mole of $NF_3$. A large amount of admixtures in crude nitrogen trifluoride and the presence of hydrogen in the electrolysis gases adds to the cost of the process of gas purification from the admixtures and calls for taking measures to make the process explosion-safe.

Another known trend in producing nitrogen trifluoride is the direct fluorination of ammonia with elemental fluorine by the reaction:

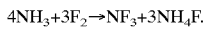

Synthesis of nitrogen trifluoride by the direct fluorination of ammonia with elemental fluorine in the vapor phase in $NF_3:F_2=(1.1–2.0):1$ molar ratios makes it possible to obtain the target product with the yield calculated on the basis of fluorine from 10 to 25% (J. Amer. Chem. Soc., 1960, 82, 5301). The low yield of nitrogen trifluoride is due to complexities in regulating the reaction temperature and to the interaction of $NF_3$ or of its intermediate synthesis products with ammonia, giving nitrogen and hydrogen fluoride. Moreover, difficulties arise with the gas separation from the forming sublimates of ammonium fluorides.

For raising the effectiveness of cooling the reaction mixture and increasing the yield of nitrogen fluoride, a method is proposed for the fluorination of ammonia in the presence of sulfur hexafluoride, hexafluoroethane or tetrafluoromethane (JP 2-255513, C01B 21/083, Oct. 16, 1990).

With the molar ratio of diluent gas to ammonia of (5–100):1 and of fluorine to ammonia of (3–20):1, the temperature in the reactor of 80 to 250° C., the yield of $NF_3$ was from 30 to 59.5%. The maximum yield of nitrogen trifluoride was obtained with the molar ratio $NF_3:SF_6$ equal to 4:100. The results cited in said Japanese Patent indicate that the content of the target product in waste gases should not exceed 1–2 vol. %, consequently, its concentration to 99% along with regeneration of the diluent gas will require substantial capital inputs.

Furthermore, separating sublimates (melts) of ammonium hydrogen fluorides from diluted gases is a technically complicated operation. Therefore, the possibilities of industrial implementation of this method are not high.

For overcoming the above-indicated disadvantages, the authors of U.S. Pat. No. 4,091,081, C01B 21/52, May 23, 1978 and U.S. Pat. No. 5,637,285, C01B 21/06, Jun. 10, 1997 proposed methods for preparing nitrogen trifluoride by the fluorination with elemental fluorine of ammonia dissolved in a melt of ammonium hydrogen fluorides, at the process temperature of from 93 to 209° C. and an $NF_3:HF$ molar ratio equal to 1:(2.0–2.5) and 1:(2.55–2.85), respectively.

Carrying out the synthesis of nitrogen trifluoride in the liquid phase of a melt of ammonium hydrogen fluorides may provide an effective removal of the exothermal reaction heat and, in the main, solve the problem of separating ammonium hydrogen fluorides from the target product.

However, industrial implementation of these processes will require taking strictest explosion-safety measures in connection with using ammonium and elemental fluorine in the technology. Furthermore, with sufficiently high yields of nitrogen trifluoride (65%), the consumption of fluorine-containing starting materials is unjustifiably high, since more than 60% of fluorine used in the technology is converted into ammonium hydrogen fluorides, the regeneration of hydrogen fluoride from which is sufficiently complicated.

In the combination of essential features, the closest to the herein-proposed process is the method of producing nitrogen fluorides by the direct fluorination with elemental fluorine of ammonia derivatives containing nitrogen-hydrogen bonds, such as alkali metal amides, urea, biuret, sulfamide, formamide, hydrazine, ethylene diamine, melamine at a temperature of 0–300° C. in the presence of a catalyst: a metal fluoride forming an acid salt with HF (U.S. Pat. No. 3,961,024, C01B 21/52, Jun. 1, 1976). For instance, the fluorination of 50% mixtures of urea with sodium fluoride or sodium hydrogen fluoride by a gaseous mixture containing 50 vol. % of $F_2$ gave a gas having the composition: 10–17 vol. % of $NF_3$ and 3–13 vol. % of $N_2F_4$. Along with nitrogen fluorides, the production gas contained admixtures of $COF_2$, $CO_2$, $CF_4$, and $NO_3F$. The fluorination of mixtures of biuret with lithium fluoride or sodium hydrogen fluoride (1:1) by diluted elemental fluorine leads to the formation of a gas containing 6–47 vol. % of $NF_3$ and 2.6–26 vol. % of $N_2F_4$.

The disadvantages of the known method are: a low selectivity of the process of producing nitrogen trifluoride because of formation of tetrafluorohydrazine, and the use of a large amount (100–400%) of the catalyst which must be regenerated.

Furthermore, an increase in the volumes of reactors in the exothermal processes of "gas-solid" systems involves difficulties with cooling, while overheating of solid mixtures leads to sintering of the reagents with subsequent unpredictable slowing-down of the fluorination process rate, as well as to the evolution of excess ammonia that forms explosion-hazardous mixtures with fluorine.

DISCLOSURE OF THE INVENTION

It is an object of the present invention to provide an explosion-safe process for the synthesis of nitrogen trifluoride and to increase the process selectivity.

Said object is accomplished by carrying out direct fluorination with elemental fluorine of mixtures (solutions or suspensions) of nitrogen-containing compounds with anhydrous hydrogen fluoride under conditions insuring selectivity of the nitrogen trifluoride synthesis: the process temperature of −20–0° C. and the molar ratio of fluorine to nitrogen-containing compounds not over 3.

The nitrogen-containing compounds are selected from the group comprising urea and products of its decomposition, such as biuret, cyanuric acid, ammelide, melamine, formamide. It is preferable to use urea for the synthesis, since urea is a cheaper and more readily available starting material, convenient to handle.

In this case the selectivity of the nitrogen trifluoride synthesis in the claimed process is insured by the conditions of the predominant course of the fluorination reactions described by the following chemical equations:

  (3)

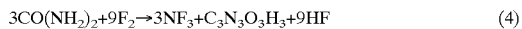  (4)

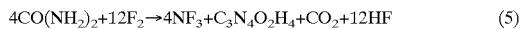  (5)

with an insignificant course of reactions (1) and (2) presented earlier.

BEST VARIANTS OF CARRYING OUT THE INVENTION

The fluorination process is preferably carried out in the initial period at a temperature of from −20 to −10° C. and consumption of elemental fluorine corresponding to the molar ratio to the starting compounds of not over 0.5. In this case conditions are provided for the following reactions to proceed:

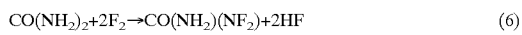  (6)

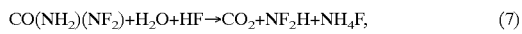  (7)

these reactions insuring practically complete elimination of water traces and also of a considerable part of such admixtures as NO, $CO_2$, $CF_4$, $N_2O$.

At a fluorination temperature below −20° C., crystallization of the starting compounds starts, whereas at a temperature above −10° C. losses of nitrogen fluorides with waste gases grow. An increase in the molar ratio of fluorine to the starting compounds above 0.5 in the initial period leads to losses of nitrogen fluorides with waste gases and to lowering the yield of the final product.

The process of fluorination under the above-described conditions is carried out until traces of nitrogen trifluoride appear in the waste gases. Then, after the formation of nitrogen trifluoride, further fluorination is preferably carried out at a temperature of from −15 to 0° C. and at the molar ratio of fluorine to the starting nitrogen-containing compounds not over 3.0.

It should be noted that the set object is accomplished at any temperatures ranging from −20° C. to 0° C. and at a molar ratio of fluorine to starting nitrogen-containing compounds not exceeding 3.

With an increase of fluorine consumption to more than 3 moles per mole of the starting compounds, the concentration of such admixtures as $CO_2$, $COF_2$ and $CF_4$ in the finished product sharply increases. An increase of the fluorination temperature above 0° C. leads to the predominant course of reactions (1) and (2) and to lowering of the process selectivity.

For the fluorination use is made of elemental fluorine, preferably with a concentration of at least 50% by weight; it is most expedient to use elemental fluorine with a concentration of 90–98% by weight.

The content of the starting product in a mixture with anhydrous hydrogen fluoride is preferably from 20 to 50% by weight. With the content of starting compounds in the mixture less than 20%, the rate of fluorination substantially lowers. At the same time, if use is made of mixtures of starting compounds with anhydrous hydrogen fluoride with a concentration over 50%, solutions begin to crystallize and involve technological difficulties in the process of synthesis.

The process of fluorination runs at a pressure of from 0.7 to 1.7 $kgf/cm^2$.

The synthesis of nitrogen trifluoride can be effected either in a packed column or in a column with liquid spraying, or in a bubble-type reactor. The simplest equipment implementation of the fluorination process comprises a reaction vessel provided with cooling elements. The reaction is charged with a solution of urea or other starting compound in anhydrous hydrogen fluoride, and elemental fluorine is fed via a bellows. Temperature regulation and removal of the reaction heat are effected with the help of a −40° C. brine, supplied to the cooling elements.

The product of the fluorination reaction do not form stable compounds with anhydrous fluorine, therefore regeneration of the latter reduces to distillation thereof at a temperature of up to 150° C. with a yield to 90% for HF.

The resulting gaseous mixture containing as the main admixtures $N_2$, $F_2$, NO, $N_2F_2$, $CO_2$, $COF_2$, $N_2O$ and $CF_4$ is passed through a reflux condenser cooled with the −40° C.

brine and subjected to alkali purification with KOH or $K_2CO_3$ solutions from excess fluorine and other oxidants. Further purification of the gas is effected by sorption techniques until condensed nitrogen trifluoride with the $NF_3$ content of 98.0–99.0% by weight is obtained.

The composition of gaseous products of the fluorination is determined by chemical, potentiometric, chromatographic and spectral analysis techniques.

So, an explosion-safe process for preparing nitrogen trifluoride by the direct fluorination of urea or decomposition products thereof has been provided. This process makes it possible to obtain a product with a maximum content of nitrogen trifluoride and a minimum concentration of admixtures, with a yield of up to 90%. Mild fluorination conditions give an opportunity to simplify the equipment implementation of the process and to attain a high degree of utilization of fluorine-containing starting materials.

EXAMPLES

Examples which follow are given for illustrating the proposed invention but not for limiting it.

Example 1

For the synthesis a 60-liter capacity metallic reaction vessel is used, provided with a cooling jacket, a thermocouple, a bubbling device in the form of a bellows for feeding gaseous fluorine, a reflux condenser cooled with a $-35°$ C. brine for precluding the efflux and losses of hydrogen fluoride from the reaction vessel, process connecting pipes for charging and discharging the products, a pressure sensor.

The cooled reaction vessel is charged successively with 10 kg of urea and 40 kg of anhydrous hydrogen fluoride. The resulting solution of urea in anhydrous hydrogen fluoride with the concentration of 20% by weight is cooled down to $-19°$ C., and 5.7 m³ of gaseous fluorine (98 vol. %) are supplied at a rate ensuring the content of oxidants on conversion to $F_2$ in the fluorination waste gases not over 3.0%. The content of oxidants is determined iodometrically. The molar ratio of fluorine to urea is 1.5.

The gaseous mixture outgoing from the reaction vessel is cooled in the reflux condenser and pumped with the help of a compressor into a receiver of 1 m³ capacity. The obtained gaseous mixture has the following composition, in vol. % : $NF_3$, 61.0; $CF_4$, 2.5; $CO_2+COF_2$, 5.3; $N_2F_2$, 0.4; $N_2O$, 2.1; the sum of oxidants, 2.7.

Further purification of $NF_3$ is carried out by sorption techniques until condensed nitrogen trifluoride containing 99.0 vol. % of the main substance is obtained.

The yield of nitrogen trifluoride, determined from the ratio of the volume of nitrogen trifluoride obtained in the receiver to one third of the volume of gaseous fluorine consumed in the process, is 65.3%.

Example 2

The process is carried out as in Example 1. The conditions of carrying out the process and the obtained results are presented in the Table.

Example 3

For carrying out the synthesis, a reaction vessel described in Example 1 is used. The cooled reaction vessel is charged successively with 20 kg of urea and 32 kg of anhydrous hydrogen fluoride. The resulting solution of urea in anhydrous hydrogen fluoride is cooled down to $-20°$ C., and gaseous fluorine (98 vol. %) is supplied at a rate ensuring the content of oxidants on conversion to $F_2$ in the fluorination waste gases not over 0.5%. Initially the volume of passed fluorine, at which $NF_3$ appears in the waste gases, is 3 m³, this corresponding to the molar ratio $F_2:CO(NH_2)_2$ equal to 0.4. The gaseous mixture outgoing from the reaction vessel, which contains in the main admixtures ($CF_4$, 5.6 vol. %; $CO_2+COF_2$, 22.4 vol. %; $N_2F_2+NF_2H$, 0.2 vol. %; $N_2O$, 11.2 vol. %; oxidants, 0.4 vol. %) and 0.7 vol. % of $NF_3$, is cooled in a reflux condenser and blown off through a column with a lime absorbant.

After the appearance of nitrogen trifluoride in the waste gases, the fluorination is carried out at the temperature of $-5°$ C., gaseous fluorine being supplied with a rate insuring the content of oxidants on conversion to $F_2$ in the fluorination waste gases not over 3.0%.

The gaseous mixture outgoing from the reaction vessel is cooled in the reflux condenser and pumped with the help of a compressor into a receiver of 1 m³ capacity. The obtained gaseous mixture has the following composition, in vol. % : $NF_3$, 86.2; $CF_4$, 0.7; $CO_2$ and $COF_2$, 4.3; $N_2F_2$, 0.2; $N_2O$, 2.7; the sum of oxidants, 1.5.

The amount of consumed fluorine is 3.8 m³, this corresponding to the molar ratio $F_2:CO(NH_2)_2$ equal to 0.5.

The yield of nitrogen trifluoride is 94.58%.

The syntheses that follow (Examples 4–9) were carried out as described in Example 3. The process conditions and the obtained results are presented in the Table.

TABLE

SYNTHESIS CONDITIONS AND OBTAINED RESULTS

| | Quantity of starting reagents | | | Concentration of starting compound in HF, % | Molar ratio $F_2$: starting compound | Temperature of flourination, °C | Obtained composition of gaseous mixture, vol. % | | | | | | | Yield of $NF_3$, % |
|---|---|---|---|---|---|---|---|---|---|---|---|---|---|---|
| Nos | Starting compound, kg | Hydrogen flouride, kg | Flourine, m³ | | | | $NF_3$ | $CF_4$ | $CO_2$ + $COF_2$ | $N_2F_2$ + $NF_2H$ | $N_2$ | Res. $F_2$ | $N_2$ + NO | |
| 1. | Urea 10 | 40 | 5.7 | 20.0 | 1.5 | −19 | 61.0 | 2.5 | 5.3 | 0.4 | 2.1 | 2.7 | | 65,3 |
| 2. | 20 | 20 | 5.2 | 50 | 0.7 | −2 | 82.3 | 0.9 | 3.8 | 0.1 | 2.5 | 2.0 | | 90,5 |
| 3. | 20 | 32 | 3 | 38.5 | 0.4 | −20 | 0.7 | 5.6 | 22.4 | 0.2 | 11.2 | 0.4 | | Blowing |
| | | | 3.8 | | 0.5 | −5 | 86.2 | 0.7 | 4.3 | 0.2 | 2.7 | 1.5 | | 94.9 |

TABLE-continued

SYNTHESIS CONDITIONS AND OBTAINED RESULTS

| Nos | Quantity of starting reagents | | | Concentration of starting compound in HF, % | Molar ratio $F_2$: starting compound | Temperature of flourination, °C | Obtained composition of gaseous mixture, vol. % | | | | | | | Yield of $NF_3$, % |
|---|---|---|---|---|---|---|---|---|---|---|---|---|---|---|
| | Starting compound, kg | Hydrogen flouride, kg | Flourine, m³ | | | | $NF_3$ | $CF_4$ | $CO_2 + COF_2$ | $N_2F_2 + NF_2H$ | $N_2$ | Sum of oxidants $F_2$ | Res. $N_2 + NO$ | |
| 4. | 20 | 32 | 3.0 7.6 | 38.5 | 0.4 | −20 | 0.7 | 5.5 | 22.3 | 0.2 | 11.0 | 0.4 | | Blowing 84.1 |
| | | | | | 1.0 | −5 | 80.1 | 0.5 | 2.1 | 0.3 | 1.8 | 1.2 | | |
| 5. | 20 | 32 | 3.0 22.8 | 38.5 | 0.4 | −18 | 0.5 | 5.4 | 21.3 | 0.2 | 10.8 | 0.4 | | Blowing 55.3 |
| | | | | | 3.0 | −5 | 49.7 | 0.6 | 9.4 | 0.6 | 0.8 | 2.7 | | |
| 6. | 20 | 20 | 2.0 15.2 | 50.0 | 0.3 | −12 | 0.3 | 4.2 | 18.1 | 0.2 | 9.1 | 0.5 | | Blowing 59.5 |
| | | | | | 2.0 | 0 | 54.1 | 0.5 | 5.2 | 0.5 | 1.2 | 2.2 | | |
| 7. | 10 | 40 | 2.0 3.8 | 20.0 | 0.5 | −15 | 0.5 | 5.1 | 14.7 | 0.3 | 10.3 | 0.5 | | Blowing 77.0 |
| | | | | | 1.0 | −10 | 70.0 | 0.4 | 3.0 | 0.2 | 1.6 | 3.2 | | |
| 8. | 15 | 35 | 3.0 8.6 | 30.0 | 0.5 | −15 | 0.5 | 4.8 | 17.4 | 0.2 | 9.8 | 0.5 | | Blowing 68.6 |
| | | | | | 1.5 | −10 | 75.4 | 0.4 | 2.0 | 0.4 | 1.1 | 1.5 | | |
| 9. | Biuret 15 | 35 | 3.0 9.95 | 30.0 | 0.5 | −10 | 0.7 | 5.8 | 16.4 | 0.3 | 8.9 | 0.5 | | Blowing 60.3 |
| | | | | | 1.5 | −5 | 59.1 | 0.5 | 6.0 | 0.5 | 1.1 | 2.6 | | |

What is claimed is:

1. A process for preparing nitrogen trifluoride, by the fluorination of urea and products of urea decomposition with elemental fluorine in anhydrous hydrogen fluoride at a temperature of −20° C. to 0° C. and with the molar ratio of said fluorine to the urea and products of urea decomposition of not over 3.

2. The process of claim 1, wherein the concentration of said urea and products of urea decomposition in said anhydrous hydrogen fluoride is 20–50% by weight.

3. The process of claim 1, wherein the fluorination is carried out at a temperature of −20° C. to −10° C. and with the molar ratio of fluorine to the urea and products of urea decomposition of not over 0.5 till the moment of appearance of nitrogen trifluoride in the fluorination waste gases.

4. The process of claim 3, wherein after the appearance of nitrogen trifluoride in the fluorination waste gases the fluorination is carried out in the temperature range of −15° C. to 0° C.

* * * * *